United States Patent
Depping et al.

(10) Patent No.: US 6,819,987 B2
(45) Date of Patent: Nov. 16, 2004

(54) METHOD FOR EARLY RECOGNITION OF ABNORMAL OCCURENCES IN THE OPERATION OF AUTOMATIC OR AUTOMATED GEARBOXES

(75) Inventors: Herbert Depping, Giengen (DE);
Bernd Dietzel, Syrgenstein (DE);
Thomas Schönharr, Steinheim (DE)

(73) Assignee: Voith Turbo GmbH & Co. KG, Heidenheim (DE)

(*) Notice: Subject to any disclaimer, the term of this patent is extended or adjusted under 35 U.S.C. 154(b) by 25 days.

(21) Appl. No.: 10/240,637

(22) PCT Filed: Feb. 1, 2002

(86) PCT No.: PCT/EP02/01041
§ 371 (c)(1),
(2), (4) Date: Nov. 5, 2002

(87) PCT Pub. No.: WO02/063188
PCT Pub. Date: Aug. 15, 2002

(65) Prior Publication Data
US 2004/0020736 A1 Feb. 5, 2004

(30) Foreign Application Priority Data
Feb. 7, 2001 (DE) .......................... 101 05 836

(51) Int. Cl.[7] ............................................. F16H 61/12
(52) U.S. Cl. ........................... 701/29; 701/62; 477/906
(58) Field of Search ........................ 701/29, 62, 64; 477/906

(56) References Cited

U.S. PATENT DOCUMENTS 5,016,174 A * 5/1991 Ito et al. .................... 701/62
5,515,272 A * 5/1996 Sakai et al. ................ 701/29
5,613,583 A   3/1997 Kono et al. ............... 192/3.31
5,719,767 A * 2/1998 Jang ........................... 701/62
5,846,162 A * 12/1998 Ito et al. ..................... 477/143
5,921,885 A * 7/1999 Tabata et al. ............... 477/107
6,223,873 B1 * 5/2001 Ahnert et al. .............. 192/3.56

FOREIGN PATENT DOCUMENTS

| DE | 196 52 212 | 6/1998 |
| DE | 197 45 175 | 5/1999 |
| DE | 198 57 961 | 6/2000 |
| EP | 0 310 277  | 4/1989 |
| EP | 0 668 456  | 8/1995 |
| EP | 0 849 505  | 6/1998 |

* cited by examiner

Primary Examiner—Michael J. Zanelli
(74) Attorney, Agent, or Firm—Baker & Daniels

(57) ABSTRACT

The invention relates to a method for early recognition of abnormal occurrences in the operation of automatic or automated gearboxes wherein at least one variable $A_{kraftschl}$ directly or indirectly characterizing the strain on elements which are to be coupled to each other in a non-positive fit is continuously determined after an n-th shift at least until a synchronous rev speed is reached or during a maximum shift period $T_{max}$; wherein the variable $A_{kraftschlüssig}$ characterizing the strain on the elements that are to be coupled is mathematically combined with the time, or if several variables $A_{kraftschlüssig}$ Exist, said variables are mathematically combined with each other and the product of said combination is added up in the form of a variable $W_{sum}$; wherein the product thereof is compared with a first pre-definable or defined threshold value $W_{max0}$ Which, if exceeded, defines a state from which damage can be deduced and the shift action is aborted.

20 Claims, 4 Drawing Sheets

FIG_1

METHOD FOR EARLY RECOGNITION OF ABNORMAL OCCURENCES IN THE OPERATION OF AUTOMATIC OR AUTOMATED GEARBOXES

BACKGROUND OF THE INVENTION

The invention relates to a method for early recognition of abnormal occurrences in the operation of automatic or automated transmissions with shift elements being active in a non-positive fit.

Automatic transmissions, especially automatic transmissions in vehicles, and automated transmissions are known in a multitude of embodiments. They are available as purely mechanical transmissions, a combination of at least one mechanical transmission component and a hydraulic transmission component, or a mechanical transmission component and an electric transmission component, or a variable mechanical transmission. The hydraulic transmission component can comprise either a hydrostatic transmission component or a hydrodynamic component. If a transmission has at least two different transmission components, they are either connected in series or they operate with torque division. Such transmissions where a mechanical component is combined with a hydraulic component are described, for example, by J. M. Voith GmbH in "Hydrodynamics in Motive Power Engineering", Krauskopf Verlag, 1987.

In most automatic and automated transmissions, the elements for changing the traveling conditions or the operating range utilized by the drive unit are controlled by electro-hydraulics. The desired traveling condition is pre-selected or changed by means of a control element in the form of a gearshift lever or a push-button switch. The physical values characterizing such operation then generate respective electrical signals that trigger control valves, which in turn actuate individual shift elements so as to realize a non-positive engagement or disengagement.

In fully automatic transmissions, the gears are changed automatically via a hydraulic or electro-hydraulic control system in dependence of the strain on the engine and the speed of the vehicle. The gears are changed with the aid of brake bands, multiple clutches or multiple disc brake systems under load. The primarily used shifting elements are hydraulically operated friction elements, preferably in the form of multiple disc clutches, flexible disc clutches and/or brakes whose function is to establish or interrupt the flux of force in the transmission in accordance with the selected gear.

Abnormal shift actions and conspicuous noise in the transmission are signs of abnormal occurrences in the transmission unit. It is known in the art to detect the cause of abnormal gear shifting by testing the modulator, controller and working pressures. The transmission is then provided with the required test connections where the test equipment with various measuring ranges can be connected. The modulator and working pressures can be tested while the vehicle is standing still with the engine running, but the controller pressure has to be tested while the vehicle is moving or on a roller test stand. However, most of the time, a diagnosis is not made until abnormal shift actions have occurred to a considerable degree, and specifically, until conspicuous noise in the transmission already caused higher wear on the friction elements to be coupled to each other in a non-positive fit. Therefore, the indicators for investigating abnormal shift occurrences are abnormal occurrences in the operation of an automatic transmission caused by damage. Usually, corrective action then involves the replacement of components.

Therefore, a method for early recognition of abnormal occurrences is known from DE 196 52 212 A1, especially early recognition of damage, using suitable indicators by means of which changes in the transmission, changes in the air-oil supply and in the components pertaining to the transmission control are detected early, as follows:

While the automatic transmission is in operation, a current actual value of at least one variable at least indirectly characterizing a shift action is determined in each shift. Said actual value is compared with at least one reference value for similar shift actions. If they deviate, the manipulated variable for actuating the elements of a shifting element to be brought into working connection in a non-positive fit is changed so as to at least indirectly influence the variable characterizing the shift action. At least one threshold value can be set for the actual value of a variable at least indirectly characterizing the shift action and/or at least one threshold value can be set for a variable at least indirectly characterizing the changing behavior of the actual value via a plurality of successively completed similar shift actions, i.e. from a first original gear to a following second target gear. The threshold values are associated with criteria characterizing an acceptable behavior of the actual value compared to the threshold value. If the threshold value deviates from the actual value such that said criteria are no longer met, an error message or an error signal is generated. The criteria for comparing the actual values or the changing behavior of the actual value with the threshold value or threshold values signify that the threshold value or threshold values are intended to cover a certain actual value range, within which the transmission is not damaged by operation. A substantial disadvantage of such a method is that the reference and actual values are adjusted via an adaptive control or regulation strategy. In this case, an abnormal occurrence or a potential subsequent abnormal occurrence can only be deduced indirectly in that the desired result is not achieved via adaptation. Therefore, said method can be used only for transmissions with adaptive gear shifting. Other transmission units which are based on other shifting systems characterizing the method of operation cannot be monitored with such methods.

SUMMARY OF THE INVENTION

Therefore, the aim of the invention is to develop a method for early recognition of interfering factors in the operation of an automatic or automated transmission which allows that damage and functional failure caused especially by manufacturing or assembly errors and by increasing wear, among other factors, are detected early, irrespective of the shift program, which means before any damage occurs which highly affects the function and may lead to a complete breakdown, and thus preventing more significant damage to the transmission. The method should be useable irrespective of the shift program at the same cost for any type of transmission unit, for both automatic and automated transmissions.

In accordance with the invention, during a shift action, especially shifting up, down or braking, a value at least indirectly characterizing the strain on the elements to be coupled to each other in a non-positive fit is determined continuously and added up in the form of a variable. In the easiest case, such value at least indirectly characterizing the strain on the elements to be coupled to each other in a non-positive fit is the friction work. It is determined by mathematically combining the difference between the respective current speed on the drive side, especially the transmission input shaft or the drive unit coupled with said shaft and the synchronizing speed of the following gear, also called target gear, and the pressure acting on the shifting element, especially the friction surfaces of the shifting elements to be brought into active connection. Synchronous speed of the following gear means the speed at the input of the gears, i.e. on the power take-off of the hydrodynamic component or the bridging coupling. The result is added up in the form of a variable where additional influencing factors, such as the current readjusting spring power and the centrifugal force are also included.

Before a shift, said variable is always reset to zero. The computation begins as soon as the current speed deviates from the synchronous speed of the last gear to be exited, i.e. the original gear, when the target gear is put in, or when a predefined time period has elapsed since the outgoing gear shift element has been disengaged or since the shift began. Said value is relevant, especially in a case where it is detected that a shifting element is not fully disengaged. The addition ends when the synchronous speed or a corresponding comparative speed at least indirectly characterizing the synchronous speed is reached in the selected gear, i.e. the target gear, or if the shift action is aborted or the maximum shift period $T_{max}$ is exceeded or has elapsed.

The value of the added up variable is compared with a predefined or definable maximum value, which may have been determined by trials. If it is exceeded, the original gear is put in again and the selected target gear is blocked, at least for shift sequences between said original gear and the target gear, and a warning is issued to the driver. According to another aspect of the invention, the target gear is generally blocked for any shift action between an original gear and said target gear, i.e. the gear for which the shifting element is activated, is blocked.

When the added up variable fails to reach the maximum value, it will undergo further investigation so as to take precautionary measures against any potentially developing damage which may occur at some time in the future. Such measures need not necessarily block the target gear or the gear characterized by operating the monitored shifting element.

Usually, a warning will be issued in this case. Such precautionary measures include, among others, influencing the traveling and shifting behavior such that the shifting elements (to be monitored) are no longer exposed, or only in exceptional cases, to situations which may cause damage in continuous operation.

According to the above method, specific conclusions are easily drawn with regard to the condition of the elements involved in a shift in that the individual shift actions are analyzed. Usually, the values that are measured in any event will be taken into consideration, so that the additional sensory effort can be minimized. The maximum value characterizes a condition of minor damage, which will not yet directly affect operations, but which will cause a breakdown of the transmission unit before long.

According to another aspect of the invention, during the shift action the output torque of the drive unit (in a combustion engine especially the engine torque) is verified as to whether it is substantially constant. If so, and if the maximum value is not reached, after synchronization is completed, i.e. after the synchronous speed in the target gear is reached, the added up variable is verified as to whether it exceeds a second, lesser maximum value. If so, a so-called first counter variable is increased. If not, said first counter variable is decreased again for the just completed shift action. The increase or decrease can take place in variably adjustable stages. These can be defined as constant values, for example, they can be represented by varying defined set values depending on how much the maximum value is exceeded, or they can be computable. The counter variables are also associated with threshold values, but at least with one threshold value.

If the first counter variable exceeds a first threshold value associated with said counter variable, the control system will issue a warning to the driver or cause a respective signal to be generated so as to trigger a device which issues a warning so that precautionary measures can be taken.

If the counter variable exceeds a second, even greater threshold value, the currently used gear with the monitored shifting element, i.e. the target gear after the next return shift, is also blocked.

When the second lesser maximum value is exceeded by the added up variable during identical shift actions from a certain first original gear into a certain target gear, the number of times the second, lesser maximum value has been exceeded is determined at the same time via the number of identical shift actions and said number is added up in the form of another second counter variable. A threshold value is associated with said second counter variable for comparison. If it is exceeded, a warning is also issued.

In order to prevent a non-uniform influence of the determined counter variable for shifts with varying engine torques the torque of the drive unit is preferably divided into several categories, and each shift and each engine torque category is provided with its own independent counter variable.

With regard to its implementation, the method of the invention is not limited to a certain control system. It can be performed in the control system of the transmission unit or if the transmission unit is integrated in a data communication system, it can be performed in a secondary or higher order control system.

BRIEF DESCRIPTION OF THE DRAWINGS

The method of the invention is explained below by means of the drawings, specifically showing the following.

By means of diagrams.

DETAILED DESCRIPTION

Figure 1:
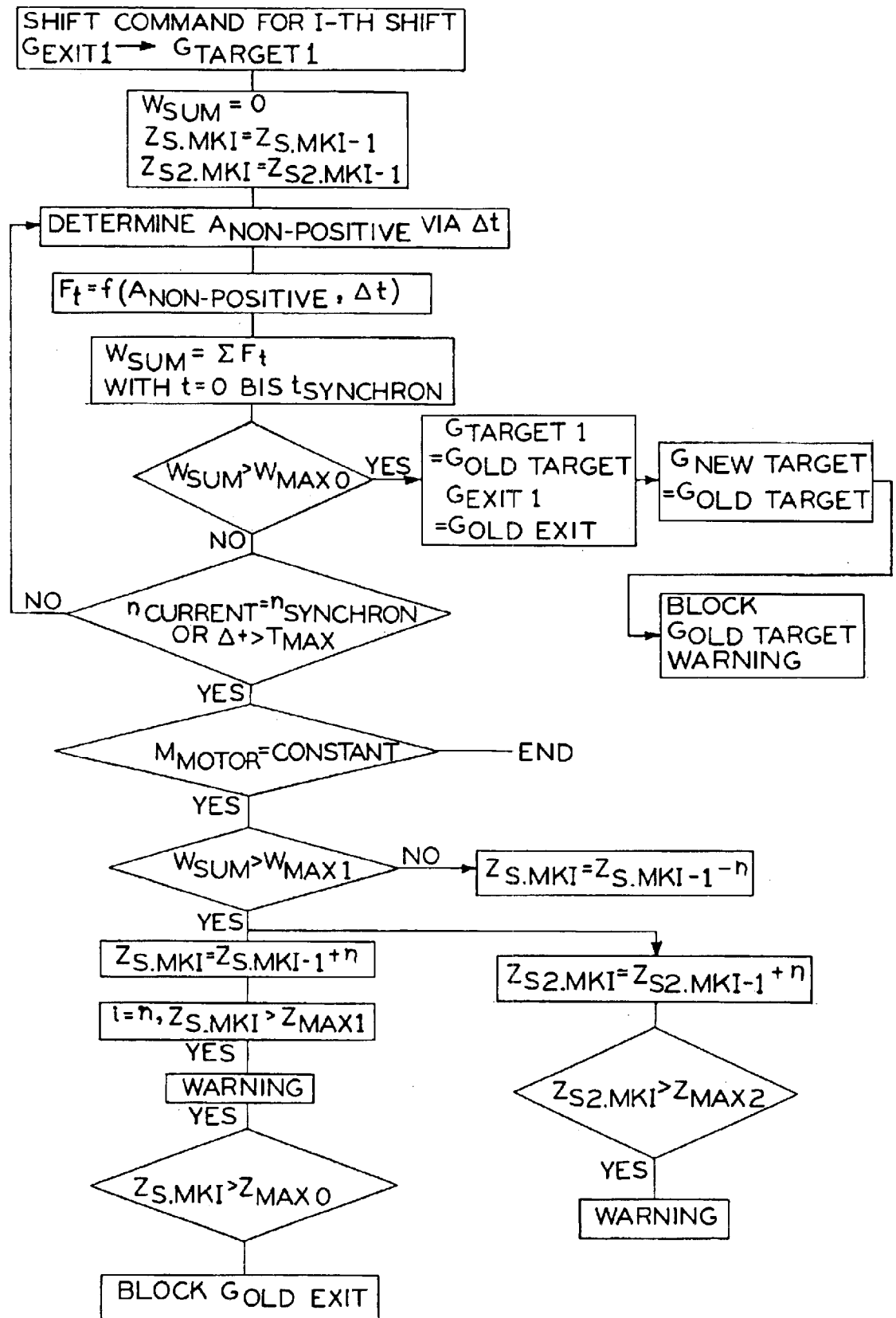
FIG. 1 illustrates the fundamental principle of the method of the invention for early recognition by means of a signal flow chart.

By means of a signal flow chart, FIG. 1 illustrates the fundamental principle of the method of the invention for early recognition of abnormal occurrences in the form of functional failure, wear, or developing transmission damage in automatic and automated transmissions. In a first step of the method, during the shift action, starting from an original gear $G_{exit}$ to a target gear $G_{target}$, at least one variable $A_{non-positive}$ characterizing the strain on the elements to be coupled to each other in a non-positive fit is continuously determined in a time interval t, especially during the sliding phase of a shift, irrespective of whether shifting up, down or braking. The variable is determined during the certain time interval t until the synchronous speed of the desired new gear $G_{target}$ is reached or a certain maximum time period $T_{max}$ is exceeded. The same shift action, for example from $G_{exit1}$ to $G_{target1}$ is monitored during a certain number i. The variable $A_{non-positive}$ characterizing the strain on the elements to be coupled in a non-positive fit is mathematically combined with the time period, defined as $F_t$ in this case, and in a third step, the result $F_t$ is added up in the form of a so-called variable $W_{sum}$ until the synchronous speed is reached. The time period is defined as $t_{synchron}$. Said variable is always set to zero at the beginning of a shift. When a pre-definable, preferably a predefined maximum value $W_{max0}$ is exceeded by the formed variable during the respective time interval the preceding gear is put in again and the current gear is blocked for further shifts, and a warning is issued to the driver. The warning can be optical or acoustical. $G_{target}=G_{exit}$.

When the synchronous speed $n_{synchron}$ is reached, the variable $W_{sum}$ is checked as to whether it exceeds a second lesser pre-definable maximum value $W_{max1}$. If exceeded, a counter variable $Z_{S,MK}$ is increased. If not, the counter variable $Z_{S,MK}$ is decreased again. If the counter variable $Z_{S,MK}$ exceeds a threshold value $Z_{max1}$ after a certain pre-definable or defined number of shift actions, the control system establishes an output value for generating a warning. The warning can be acoustical or optical. The appropriate devices for issuing a warning are triggered via the output values. The purpose of the warning is to allow the driver to take precautionary measures. If such behavior is detected during full load shifts, further deterioration of the condition of the transmission can be prevented merely by reducing the engine torque for future similar shift actions. When another, second, even greater threshold value $Z_{max0}$ is exceeded, the current gear is additionally blocked after the next return shift. Steps 6 ff. of the method, i.e. checking the maximum value $W_{max1}$, will take place only if the engine torque remained virtually constant during the shift. To this aim, the engine torque is measured during the shift action.

In the illustrated case, the counter variable of the i-th shift from $G_{exit1}$ to $G_{target1}$ is defined as $Z_{S,MKi}$, and it is formed based on the counter variable $Z_{S,MKi-1}$ of the preceding, i.e. the i-1st gear change by increasing or decreasing it by one count n. For the i-th shift from $G_{exit1}$ to $G_{target1}$ the behavior of the counter variable $Z_{S,MKi}$ in relation to the threshold values $Z_{max1}$ and $Z_{max0}$ is then compared.

Moreover, another counter variable $Z_{S2,MK}$ is provided which is used to determine when the maximum value $W_{max1}$ is exceeded. Said variable is not decreased if the shift action is normal and it is preserved as $Z_{S2,MKi-1}$ after the ignition has been turned off. If, however, a threshold value $Z_{max2}$ is exceeded, a warning is also issued to the driver. Once the cause has been eliminated, the variable $Z_{S2,MK}$ has to be reset to zero manually or by the driver.

Figure 2:
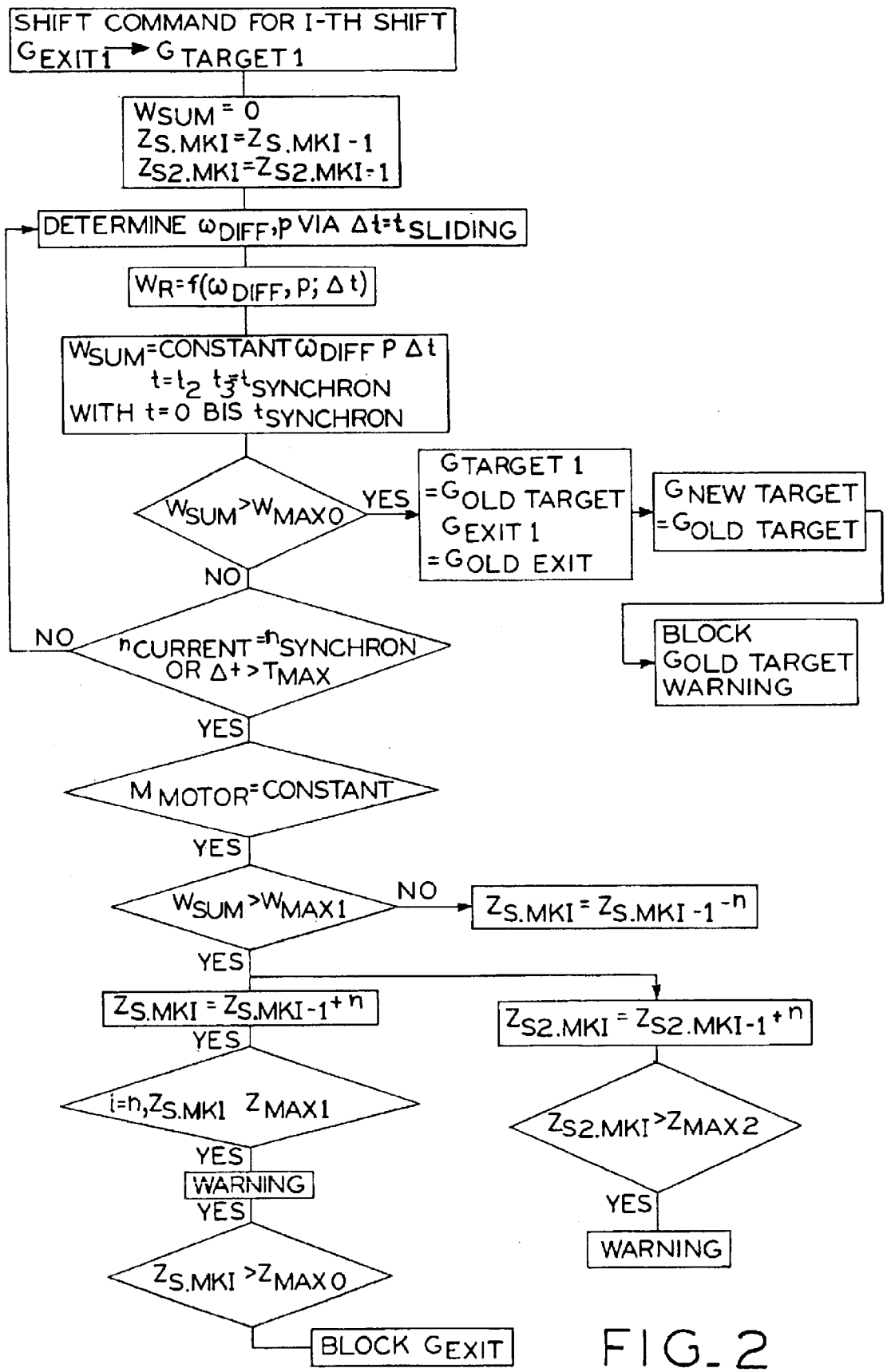
FIG. 2 illustrates an especially advantageous embodiment of a method of the invention for early recognition of abnormal occurrences.

By means of a signal flow chart, FIG. 2 illustrates how the method of the invention is performed, where the variable characterizing the strain on the elements to be coupled in a non-positive fit is described by the variables characterizing the friction work. Specifically, during the sliding phase $t_{sliding}$ of the individual elements to be coupled in a non-positive fit, the speed difference $\omega_{dif}$ of the elements to be coupled in frictional engagement and the pressure p applied on the shifting element are continuously measured. This can be achieved directly, i.e. by directly measuring the above mentioned values, or indirectly by measuring the values at least indirectly characterizing said values and converting them into the above mentioned values for speed difference $\omega_{dif}$ and the pressure p on the shifting elements. The friction work $W_R$ for a shift is computed at least cyclically and added up. Preferably, it is continuously measured and added up for a certain cycle which is determined by the time difference between two predefined time periods $t_2$ and $t_3$. The friction work $W_R$ is computed according to the following formula, for example:

$$W_R = \frac{M_R \cdot \omega_R \cdot t_R}{2}$$

$W_R$—friction work
$M_R$—sliding torque
$\omega_R$
$t_R$—sliding time or based on the values, which are measured anyway, the speed difference $\omega_{dif}$ and the pressure p applied on the individual shifting elements at any time according to the following formula:

$$W_{sum0} = \text{constant} \quad \begin{array}{c} t=t_3 \\ \cdot \mu \omega_{dif} \cdot p \cdot )t \\ t=t_2 \end{array}$$

Before a shift begins, the variable $W_{sum0}$ is always reset to a zero value. The computation of the friction work begins as soon as the current speed of the drive unit deviates considerably from the synchronous speed in the gear which was most recently put in, i.e. when a certain deviation is exceeded or an additional predefined lag time has elapsed since the shift command was issued by the control system. Therefore, said time is also defined as $t_2$. It describes the time difference between the beginning of a shift action, specifically the initialization of a shift action and a certain time period for the shift action. The addition ends when the synchronous speed, i.e. the speed of the drive unit in the selected gear reaches a respective comparative speed, or if the shift action is aborted. Said time period is defined as $t_3$ or $t_{synchron}$. The individual values are mathematically combined thus in step 2 of the method, while the addition is step 3 of the method. The addition can be continuous, i.e. parallel with determining the individual variables characterizing the elements to be coupled in a non-positive fit, or it can be done after a certain time period based on the variables characterizing the elements to be coupled in a non-positive fit which are related by the mathematical combination.

In the following step 4 of the method, the added up variable $W_{sum}$ is verified as to whether it exceeds a pre-definable or predefined maximum value $W_{max0}$. If exceeded, the preceding original gear is put in again immediately, and the shift to the desired target gear is aborted. Also, the target gear is blocked and a warning to the driver is generated which can involve acoustical or optical signals.

Additionally, during the shift action, the torque delivered by the drive unit, especially the engine torque $M_M$ is monitored and its course during the shift action is determined, especially the duration. If the engine torque remains virtually constant until the synchronous speed is reached, the variable will be further inspected. First, the value $W_{sum0}$ is checked as to whether it exceeds a second lesser maximum value $W_{max1}$.

If it is exceeded, a counter variable $Z_{S,MK}$ is increased. If not, the counter variable $Z_{S,MK}$ is decreased again. If the counter variable $Z_{S,MK}$ exceeds a threshold value $Z_{max1}$ a warning is generated so that precautionary measures can be taken. If such behavior is detected during a full load shift, the engine torque is reduced for similar shift actions in the future. Additionally, if the counter variable $Z_{S,MK}$ exceeds another second threshold value $Z_{max0}$, which is greater than the first threshold value $Z_{max1}$, the selected gear, i.e. the target gear, is blocked after the next return shift. In a multitude of drive systems, the engine torque is divided into several different categories for this analysis. Every shift and every engine torque category then has its own independent counter variable $Z_{S,MK}$ so as to prevent that shifts with varying engine torques and counter variables can affect each other. The method can be applied analog when minimum values are not reached.

Again, another counter variable $Z_{S2,MK}$ only counts the number of times the maximum value $W_{max1}$ for the friction work is exceeded. Said variable will not be decreased if the shift is normal and it is preserved after the ignition has been turned off. If a pre-definable threshold value $Z_{max2}$ is exceeded, however, a warning will also follow.

Figure 3:
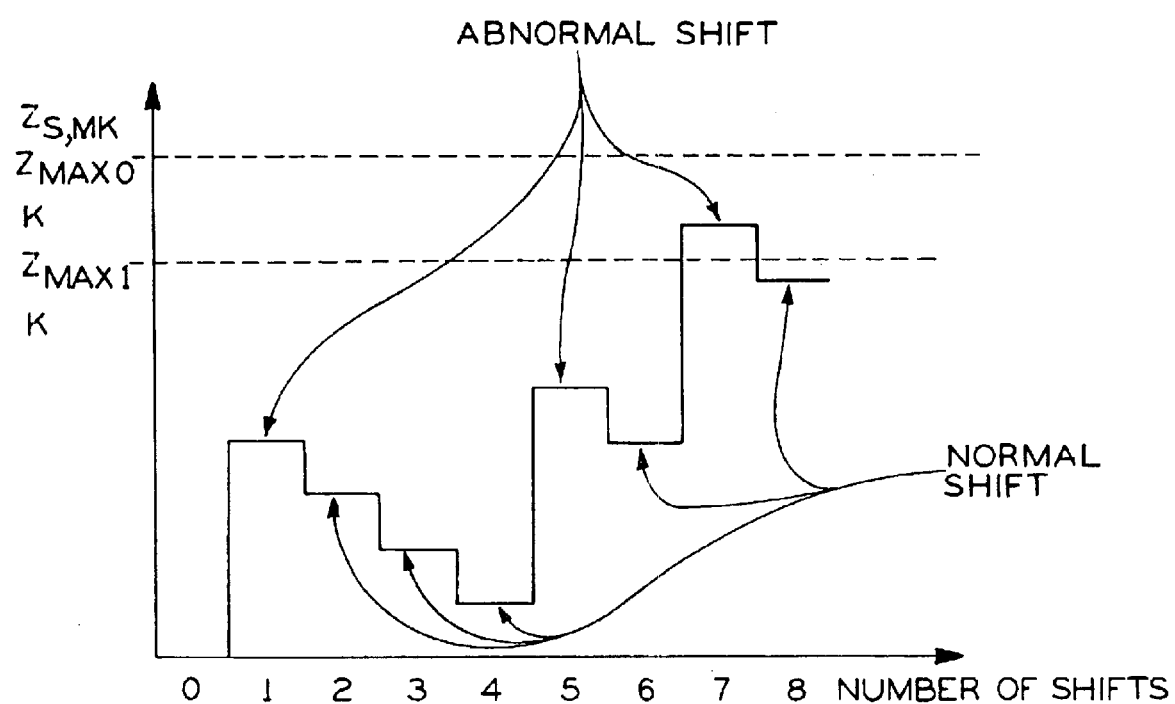
FIG. 3 illustrates the curve of the counter variables by means of a diagram.

An exemplary illustration of the curve of the counter variable $Z_{S,MK}$ is shown by means of a diagram in FIG. 3 above the number of shifts.

Figure 4A:
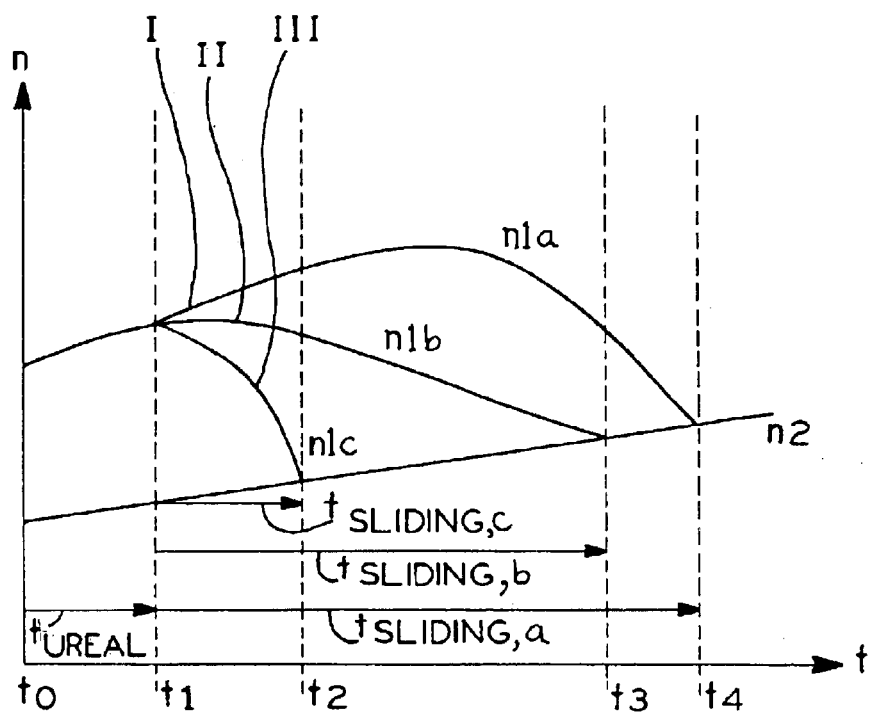
FIGS. 4a and 4b illustrate the curve of the speed of the drive unit and the output drive as well as the pertaining control pressure when switching between gears that characterize two different operating ranges.
Figure 4B:
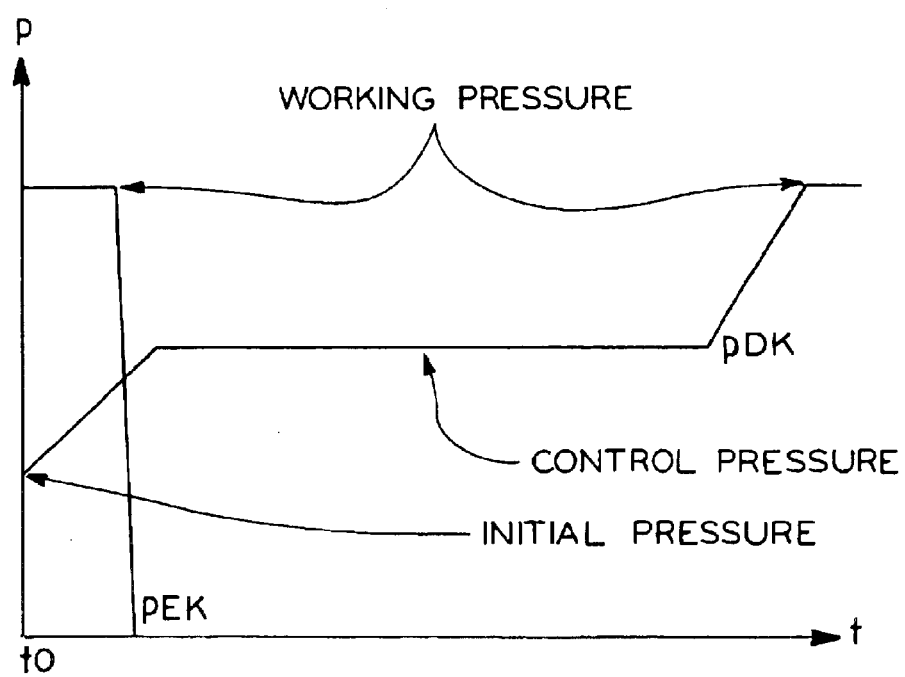

By means of diagrams, FIGS. 4a and 4b illustrate the curve of the speed of the drive unit and the pertaining control pressure during the time period of a shift. FIG. 4a shows an example of the speed curve of a drive unit $n_1$ and the output drive, i.e. for example the transmission output shaft, taking into consideration the selected gear. The shift begins at the time $t_0$ and ends at the time $t_2$ or $t_3$ when the synchronous speed is reached. The time $t_1$ illustrates the beginning of synchronization, i.e. the sliding time. The three curves I to III for the speed n of the drive unit illustrate in the first case, i.e. the curve defined as I, an excessive sliding time $t_{slidinga}$, curve II illustrates an optimal sliding time $t_{slidingb}$, and in curve III the sliding time $t_{slidingc}$, is too short. The individual time intervals, starting with $t_0$, which are the result of adding up the time periods $t_{ureal}$ and $t_{slidinga,b,c}$, especially the time intervals $t_2$, $t_3$, and $t_4$, illustrate the duration of the addition.

FIG. 4b shows the pressure curve for controlling the shifting elements, especially the control pressure as an example for a shift as per FIG. 4a according to the curve defined as I. The curve $_{PEK}$ illustrates the pressure curve for the departing shifting element, i.e. the shifting element which was activated in the original gear and which has to be disengaged in order to change the gear. The curve for $_{PDK}$ illustrates the pressure curve for the selected shifting element in the following gear, i.e. the target gear.

The solution of the invention is not limited with regard to the description of the variables characterizing the strain on the elements to be coupled in a non-positive fit as shown. Other possibilities of mathematically combining and taking into account the variables characterizing the strain are also conceivable. However, the actual selection will have to be made by the responsible specialist and depends in particular on the options of measuring individual values.

What is claimed is:

1. A Method for early recognition of abnormal occurrences in the operation of automatic and automated transmissions, comprising the following steps:

after an n-th shift between a certain original gear $G_{exit}$ and a certain target gear $G_{target}$ at least one variable $A_{non-positive}$ indirectly or directly characterizing the strain on the elements to be coupled to each other in a non-positive fit is continuously determined, at least until the synchronous speed is reached or during a maximum shift period $T_{max}$;

the variable $A_{non-positive}$ characterizing the strain on the elements to be coupled to each other in a non-positive fit is mathematically combined with the time, or if more than one variable $A_{non-positive}$ exists, said variables are mathematically combined with each other, and the result of said combination is added up in the form of a variable $W_{sum}$;

the result is compared with a first pre-definable or defined threshold value $W_{max0}$, which, if exceeded, defines a state in which damage is expected causing the breakdown of the transmission unit if operation is continued or massive interference in the function of at least one of the elements involved in the transmission of power and elements causing the transmission of power during a shift between the certain original gear and the target gear $G_{target}$, and where the shift action is aborted, and if said threshold value is not reached, an investigation is performed of developing damage on the elements involved in the transmission of power in at leas one of the original gear $G_{exit}$ and the elements causing the transmission of power in the target gear $G_{target}$ and precautionary measures with regard to the operation of the transmission are initiated.

2. Method as defined in claim 1, wherein if the first threshold value $W_{max0}$ is exceeded and thus damage is expected on at least one of the elements involved in the transmission of power and the elements causing the transmission of power in the shift sequence between the certain original gear $G_{exit}$ and the certain target gear $G_{target}$ the shift action is aborted and said target gear $G_{target}$ is blocked for all shift action between the certain original gear $G_{exit}$ and the certain target gear $G_{target}$.

3. Method as defined in claim 2, wherein if the first threshold value is exceeded a warning is issued to the driver.

4. Method as defined in claim 2, wherein if the first threshold value $W_{max0}$ is not reached when the synchronous speed is reached or during a maximum shift period $T_{max}$, the variable $W_{sum}$ is compared with a second pre-definable or defined threshold value $W_{max1}$, and, if exceeded, a first counter variable $Z_{S,MK}$ is increased and if not, the first counter variable $Z_{SiMK}$ is decreased.

5. Method as defined in claim 1, wherein if the first threshold value $W_{max0}$ is exceeded and thus damage is expected on at least of the elements involved in the transmission of power and the elements causing the transmission of power in the shift sequence between the original gear $G_{exit}$ and the target gear $G_{target}$ the shift action is aborted followed by a return shift into the original gear $G_{exit}$ and the target gear $G_{target}$ is blocked for all shift action.

6. Method as defined in claim 5, wherein if the first threshold value is exceeded a warning is issued to the driver.

7. Method as defined in claim 5, wherein if the first threshold value $W_{max0}$ is not reached when the synchronous speed is reached or during a maximum shift period $T_{max}$, the variable $W_{sum}$ is compared with a second pre-definable or defined threshold value $W_{max1}$, and, if exceeded, a first counter variable $Z_{S,MK}$ is increased and if not, the first counter variable $Z_{SiMK}$ is decreased.

8. Method as defined in claim 1, wherein if the first threshold value is exceeded a warning is issued to the driver.

9. Method as defined in claim 8, wherein if the first threshold value $W_{max0}$ is not reached when the synchronous speed is reached or during a maximum shift period $T_{max}$, the variable $W_{sum}$ is compared with a second pre-definable or defined threshold value $W_{max1}$, and, if exceeded, a first counter variable $Z_{S,MK}$ is increased and if not, the first counter variable $Z_{SiMK}$ is decreased.

10. Method as defined in claim 1, wherein if the first threshold value $W_{max0}$ is not reached when the synchronous speed is reached or during a maximum shift period $T_{max}$, the variable $W_{sum}$ is compared with a second pre-definable or defined threshold value $W_{max1}$, and, if exceeded, a first counter variable $Z_{S,MK}$ is increased and if not, the first counter variable $Z_{SiMK}$ is decreased.

11. Method as defined in claim 10, wherein if the second threshold value $W_{max1}$ is exceeded, the increased counter variable $Z_{S,MK}$ is compared with another third threshold value $Z_{max1}$ and if exceeded, a warning is issued and additionally, a comparison with a fourth threshold value $Z_{max0}$ is made.

12. Method as defined in claim 11, wherein if the fourth threshold value $Z_{max0}$ is exceeded by the counter variable damage on at least one of the elements involved in the transmission of power and the elements causing the transmission of power of the original gear $G_{exit}$ is diagnosed and said gear is blocked.

13. Method as defined in claim 12, wherein if the second threshold value $W_{max1}$ is exceeded by $W_{sum}$ the number of times the first counter variable $Z_{S,MK}$ has been increased is determined and added up in the form of a second counter variable $Z_{S2,MK}$ at the same time.

14. Method as defined in claim 11, wherein if the second threshold value $W_{max1}$ is exceeded by $W_{sum}$ the number of times the first counter variable $Z_{S,MK}$ has been increased is determined and added up in the form of a second counter variable $Z_{S2,MK}$ at the same time.

15. Method as defined in claim 14, wherein the second counter variable $Z_{S2,MK}$ is compared with a fifth threshold value $Z_{max2}$ and if exceeded, a warning will be issued to the driver.

16. Method as defined in claim 10, wherein the increase or decrease in the counter variables is made via defined set values.

17. Method as defined in claim 16, wherein the increase or decrease in the counter variables is made via varying defined set values in dependence of the value by which it is exceeded or not reached.

18. Method as defined in claim 10, wherein for identical shifts between the original gear $G_{exit}$ and the target gear $G_{target}$ with varying torque, the torque of the drive unit is divided into several torque categories of defined value and in every torque category of a shift a separate independent first counter variable is formed.

19. Method as defined in claim 1, wherein the variable $A_{non-positive}$ characterizing the strain on the elements to be coupled in a non-positive fit is formed by the friction work.

20. Method as defined in claim 19, wherein for determining friction work, the current speed difference between the speed of the transmission input shaft or the drive unit coupled with said shaft and the synchronous speed in the selected target gear and the pressure required for actuating or activating the elements to be brought into active connection in a non-positive fit are measured and the friction work is determined based on said values.

* * * * *

UNITED STATES PATENT AND TRADEMARK OFFICE
CERTIFICATE OF CORRECTION

PATENT NO. : 6,819,987 B2
DATED : November 16, 2004
INVENTOR(S) : Herbert Depping et al.

It is certified that error appears in the above-identified patent and that said Letters Patent is hereby corrected as shown below:

Title page,
Item [54], Title, delete "OCCURENCES" and substitute therefor
-- OCCURRENCES --

Column 7,
Line 58, delete "Method" and substitute therefor -- method --.

Column 8,
Line 19, delete "leas" and substitute therefor -- least --.

Signed and Sealed this

Twenty-second Day of February, 2005

JON W. DUDAS
*Director of the United States Patent and Trademark Office*